(12) United States Patent
Pahk et al.

(10) Patent No.: US 7,113,273 B2
(45) Date of Patent: Sep. 26, 2006

(54) MACHINE AND METHOD FOR INSPECTING FERRULE OF OPTICAL CONNECTOR

(76) Inventors: Heui-Jae Pahk, Na-404, Hyosu Apt., 244-2, Bongchun-dong, Kwanak-ku, Seoul (KR) 151-050; Il-Hwan Lee, 101-1101, Kookjaesanchang Apt., Sillim 10-dong, Kwannk-ku, Seoul (KR) 150-020; Hwa-Kyun Lee, 697-26, Yoksam-dong, Kangnam-ku, Seoul (KR) 135-080; Dong-Sung Lee, 636-1, kuui 1-dong, Kwanjin-ku, Seoul (KR) 143-201

( * ) Notice: Subject to any disclaimer, the term of this patent is extended or adjusted under 35 U.S.C. 154(b) by 239 days.

(21) Appl. No.: 10/501,381

(22) PCT Filed: Jan. 17, 2003

(86) PCT No.: PCT/KR03/00111

§ 371 (c)(1),
(2), (4) Date: Jul. 15, 2004

(87) PCT Pub. No.: WO03/060594

PCT Pub. Date: Jul. 24, 2003

(65) Prior Publication Data

US 2005/0041241 A1 Feb. 24, 2005

(30) Foreign Application Priority Data

Jan. 17, 2002 (KR) ...................... 10-2002-0002737

(51) Int. Cl.
*G01N 21/00* (2006.01)
*G06K 9/00* (2006.01)

(52) U.S. Cl. ................... 356/237.1; 356/73.1; 382/141

(58) Field of Classification Search ............. 356/237.1, 356/73.1, 244, 72–73; 382/152, 141, 145; 385/60, 78, 147
See application file for complete search history.

(56) References Cited

U.S. PATENT DOCUMENTS

| | | | | |
|---|---|---|---|---|
| 5,177,557 A | * | 1/1993 | Yamane | ...................... 356/73.1 |
| 5,220,407 A | * | 6/1993 | Yamane et al. | .............. 356/625 |
| 5,459,564 A | * | 10/1995 | Chivers | ...................... 356/73.1 |
| 6,340,247 B1 | * | 1/2002 | Sakurai et al. | ................. 385/78 |
| 6,466,310 B1 | * | 10/2002 | Nguyen et al. | ............. 356/73.1 |
| 6,831,738 B1 | * | 12/2004 | Rogers et al. | .............. 356/244 |

(Continued)

FOREIGN PATENT DOCUMENTS

JP 61-221632 10/1986

(Continued)

*Primary Examiner*—Gregory J. Toatley, Jr.
*Assistant Examiner*—Sang H. Nguyen
(74) *Attorney, Agent, or Firm*—Lowe Hauptman & Berner, LLP

(57) ABSTRACT

Provided is a machine for inspecting ferrules of an optical connector and a method thereof. A fixture arranges the ferrules on a rectangular system to inspect the ferrules. A robot centers first ferrule on a optical system and focuses the first ferrule on the optical system. The optical system includes two cameras for photographing inside diameter image data and outside diameter image data of the ferrule. While the robot moves sequentially the optical system and remaining ferrules, all the inside and outside diameter image data of the ferrules are in sequence obtained by the optical system. Each inside and outside diameter and eccentricity of the ferrules are calculated by the obtained inside and outside diameter image data via a computer program.

12 Claims, 12 Drawing Sheets

U.S. PATENT DOCUMENTS 6,989,895 B1 * 1/2006 Buzzetti .................. 356/237.1

FOREIGN PATENT DOCUMENTS

| | | | |
|---|---|---|---|
| JP | 05118830 A * | 5/1993 | |
| JP | 08-029642 | 2/1996 | |
| JP | 2002267403 A * | 9/2002 | |
| KR | 00198817 | 3/1999 | |
| KR | 1999-025138 | 4/1999 | |
| KR | 00269263 | 7/2000 | |

* cited by examiner

MACHINE AND METHOD FOR INSPECTING FERRULE OF OPTICAL CONNECTOR

The present application is based on International Application No. PCT/KR03/00111 filed Jan. 17, 2003, and claims priority from, Korean Application Number 10-2002-0002737, filed Jan. 17, 2002, the disclosure of which is hereby incorporated by reference herein in its entirety.

TECHNICAL FIELD

The present invention relates to a machine for inspecting ferrules of an optical connector and a method thereof, and more particularly, to a machine for inspecting ferrules of an optical connector and a method thereof in which inside diameters, an outside diameter, concentricity, and the distance between the centers of the two inside diameters of each ferrule are inspected.

BACKGROUND ART

As is well known, an optical signal generated from a light source, such as a laser, a laser diode or a light emitting diode, in an optical communication system is transmitted through an optical fiber. Optical connectors for connecting and switching two strands of optical fibers have been developed in a variety of configurations and should be manufactured so as to be able to accurately align the optical fibers so that the loss of the optical signal can be minimized. A ferrule of the optical connector is manufactured as an ultra-precision part with a tolerance of 1 μm or below. As for the ferrule of the optical connector, a cylindrical configuration is generally used with specifications as follows: 7 to 14 mm in length, 2.5 mm in outside diameter, and 125 to 127 μm in inside diameter of a hole for accommodating each optical fiber.

In order to guarantee precision and reliability of such a ferrule of an optical connector, a variety of items such as an inside diameter, an outside diameter and eccentricity are inspected. For example, a measuring apparatus disclosed in Korean Patent No. 269263 comprises a movable stage that can move along three axes, i.e. X axis, Y axis and Z axis, to measure straightness of an inside diameter of a ferrule, an illumination device for illuminating the ferrule with back light, a camera for photographing an inside diameter image of the ferrule projected by the illumination of the illumination device, and a computer for processing image data from the camera by means of a computer program. According to this technique, the inside diameter image is projected by the illumination of the illumination device passing through the interior of the ferrule defined by the inside diameter, the projected inside diameter image is photographed by the camera, and straightness of the inside diameter is measured by processing the inside diameter image data input from the camera by means of the computer program.

On the other hand, a measuring device disclosed in Korean Patent No. 198817 comprises a camera installed to be movable along three axes, i.e. X axis, Y axis and Z axis, so as to measure eccentricity of a ferrule, an illumination device for illuminating the interior of the ferrule defined by an inside diameter thereof with front light coaxially with an optical axis of the camera, and a computer for processing image data from the camera by means of a computer program. According to this technique, a test sample marked with a Cartesian coordinate system is photographed by the camera, an inside diameter image is projected by illuminating the inside diameter of the ferrule by the illumination device coaxially with the optical axis of the camera, and the projected inside diameter image is photographed by the camera. Then, Cartesian coordinate data of the test sample and the inside diameter image data that are input from the camera are processed by means of the computer program and thus eccentricity of the inside diameter with respect to the Cartesian coordinate data is measured.

However, the conventional techniques described above have a problem in that they are not appropriate to the inspection of the entire ferrule since they are constructed to perform only a separate inspection of the inside diameter of the ferrule. In particular, there is a problem in that since the outside diameter of the ferrule should be inspected using an additional device for measuring the outside diameter, the inspection process of the ferrule is substantially complicated and troublesome and thus a lot of time and manpower are required, which results in inefficiency of the inspection process. Further, although a total inspection that can completely guarantee the precision and reliability of the entire number of ferrules has been required, there is a substantial difficulty in performing the total inspection of the ferrules since the inspection can be made for only one ferrule at a time.

DISCLOSURE OF INVENTION

The present invention is conceived to solve the aforementioned problems in the prior art. An object of the present invention is to provide a machine for inspecting ferrules of an optical connector and a method thereof, wherein inside diameters, an outside diameter, eccentricity, and the distance between the centers of the two inside diameters of each ferrule can be simultaneously and precisely inspected.

Another object of the present invention is to provide a machine for inspecting ferrules of an optical connector and a method thereof, wherein inspections of a plurality of ferrules can be conveniently and efficiently made.

A further object of the present invention is to provide a machine for inspecting ferrules of an optical connector and a method thereof, wherein superior and inferior ferrules can be automatically sorted and thus a total inspection can be conveniently performed.

According to one aspect of the present invention for accomplishing the objects, there is provided a machine for inspecting ferrules of an optical connector, comprising a Cartesian coordinate type robot capable of performing 3-axis movement in X-axis, Y-axis and Z-axis directions; a fixing means installed to move in a Y-axis direction by means of the robot for arranging a plurality of ferrules in a Cartesian coordinate system; an optical system provided to move in X-axis and Y-axis directions by means of the robot for obtaining inside diameter and outside diameter image data of each of the plurality of ferrules; a first illumination means positioned below the fixing means for illuminating each of the plurality of ferrules with back light; a second illumination means positioned to move integrally with the optical system for illuminating each of the plurality of ferrules; and a computer for processing the inside diameter and outside diameter image data from the optical system by means of a computer program.

According to another aspect of the present invention, there is provided a method of inspecting ferrules of an optical connector, comprising the steps of preparing a plurality of ferrules by arranging the ferrules in a Cartesian coordinate system; centering an optical system on one ferrule of the ferrules; focusing the optical system on the one ferrule to obtain inside diameter and outside diameter image data of the one ferrule; moving each of remaining ferrules and the optical system to positions corresponding to each other and sequentially obtaining inside diameter and outside diameter image data of each of the remaining ferrules by means of the optical system; calculating an inside diameter, an outside diameter and eccentricity of each of the ferrules by processing the inside diameter and outside diameter image data of each of the ferrules by means of a computer program; and sorting each of the ferrules as superior ferrules if the inside diameter, the outside diameter and the eccentricity of each of the ferrules satisfy a tolerance and displaying the ferrules.

BRIEF DESCRIPTION OF DRAWINGS

FIGS. 10a and 8b are views showing a dog-bone ferrule as an example of a ferrule which can be inspected by the machine for inspecting ferrules according to the present invention;

BEST MODE FOR CARRYING OUT THE INVENTION

Hereinafter, preferred embodiments of a machine for inspecting ferrules of an optical connector and a method thereof according to the present invention will be described in detail with reference to the accompanying drawings.

Figure 1:
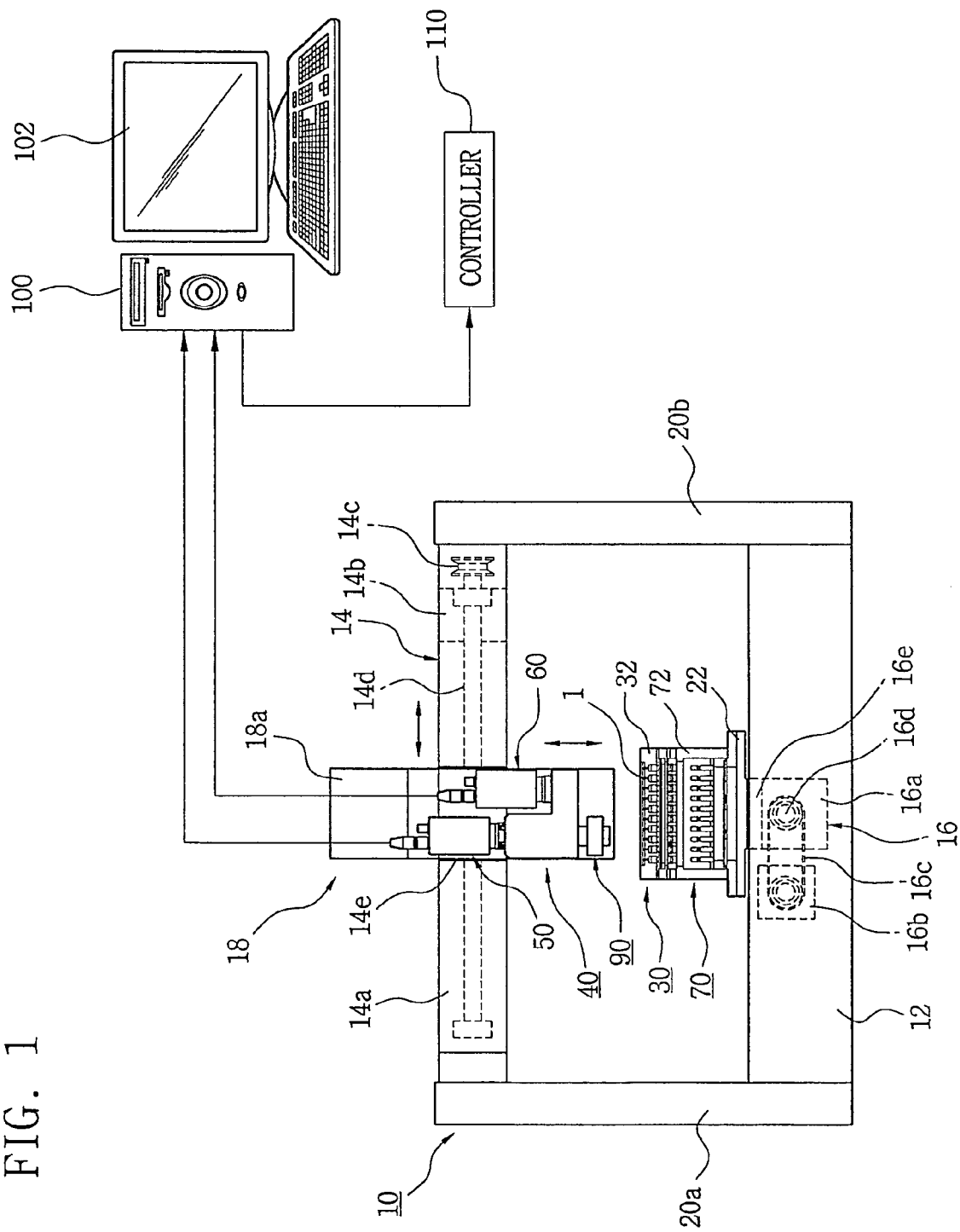
FIG. 1 is a front view showing a configuration of a machine for inspecting ferrules according to the present invention.
Figure 2:
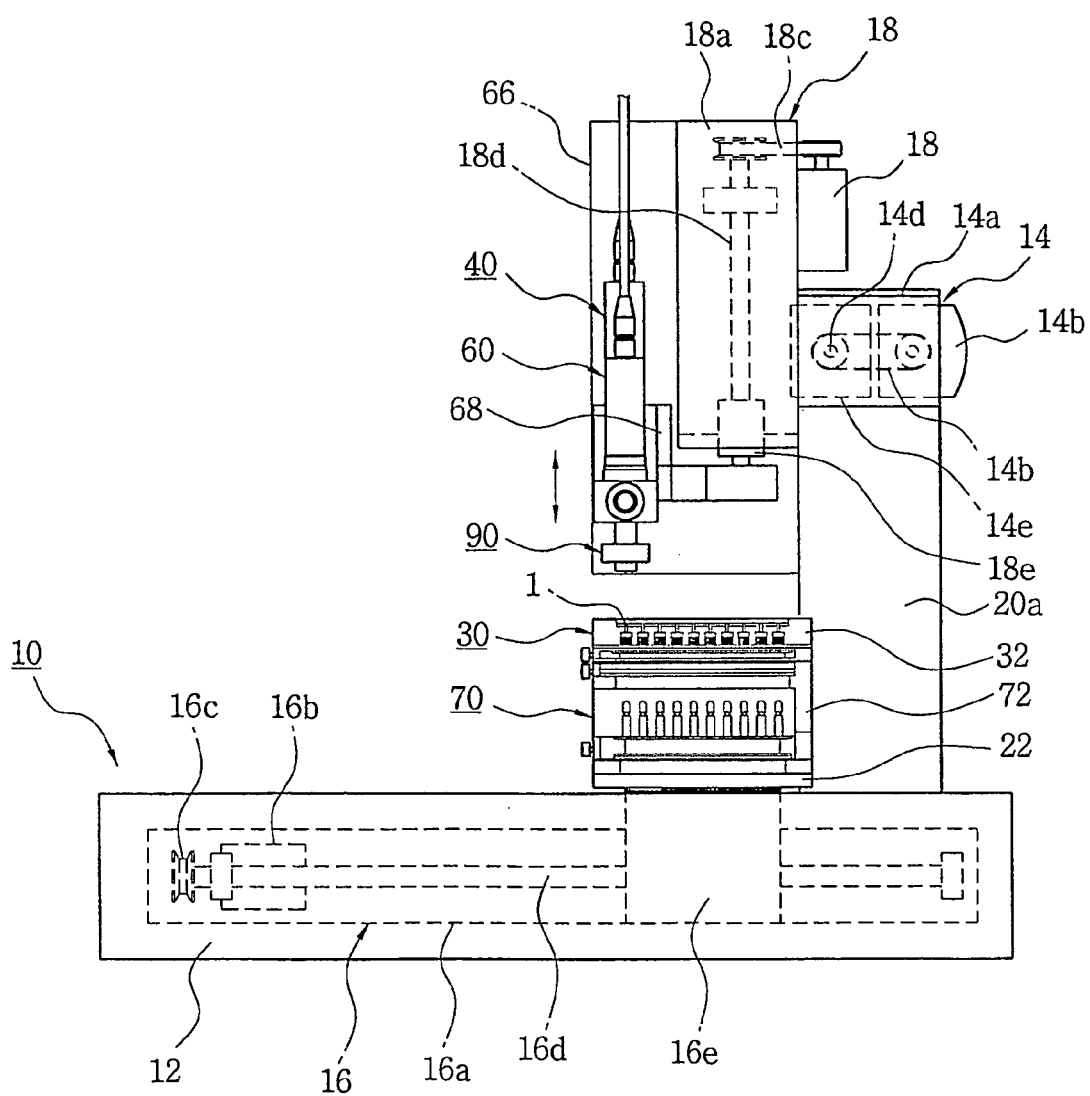
FIG. 2 is a side view showing the configuration of the machine for inspecting ferrules according to the present invention.

Referring first to FIGS. 1 and 2, the machine for inspecting ferrules according to the present invention has a Cartesian coordinate type robot 10 which moves along three axes, i.e. X axis, Y axis and Z axis. The robot 10 comprises a table 12 for providing an inspection place for ferrules 1, an X-axis linear motion actuator 14, a Y-axis linear motion actuator 16, and a Z-axis linear motion actuator 18. A pair of columns 20a and 20b stand at the left and right sides of the table 12.

The X-axis linear motion actuator 14 comprises a first guide rail 14a installed in an X-axis direction at upper ends of the columns 20a and 20b, a first ball screw 14d contained in the first guide rail 14a so as to rotate by receiving a driving force from a first servo motor 14b via a first belt transmission mechanism 14c, and a first slide 14e that is screwed by means of the rotation of the first ball screw 14d and slides along the first guide rail 14a. The Y-axis linear motion actuator 16 comprises a second guide rail 16a installed in a Y-axis direction of the table 12, a second ball screw 16d contained in the second guide rail 16a so as to rotate by receiving a driving force from a second servo motor 16b via a second belt transmission mechanism 16c, and a second slide 16e that is screwed by means of the rotation of the second ball screw 16d and slides along the second guide rail 16a. The Z-axis linear motion actuator 18 comprises a third guide rail 18a installed vertically downward from the first slide 14e of the X-axis linear motion actuator 14, a third ball screw 18d contained in the third guide rail 18a so as to rotate by receiving a driving force of a third servo motor 18b via a third belt transmission mechanism 18c, and a third slide 18e that is screwed by means of the rotation of the third ball screw 18d and slides along the third guide rail 18a. A stage 22 which can be loaded with the plurality of ferrules 1 is installed on the second slide 16e of the Y-axis linear motion actuator 16.

In this embodiment, the X-axis, Y-axis and Z-axis linear motion actuators 14, 16 and 18 of the Cartesian coordinate type robot 10 can also be constructed by eliminating the first, second and third belt transmission mechanisms 14c, 16c and 18c and directly connecting the first, second and third servo motors 14b, 16b, and 18b to the first, second and third ball screws 14d, 16d, and 18d, respectively. Each of the X-axis, Y-axis and Z-axis linear motion actuators 14, 16 and 18 of the Cartesian coordinate type robot 10 may be replaced with a linear motor guide comprising a guide rail, a slide that slides along the guide rail, and a linear motor that is contained in the slide and causes the slide to slide along the guide rail. In addition, the X-axis, Y-axis and Z-axis linear motion actuators 14, 16 and 18 may be constructed in such a manner that the linear motions of the first, second and third slide 14e, 16e and 18e can be achieved via racks and pinions, or belts and pulleys.

Figure 3:
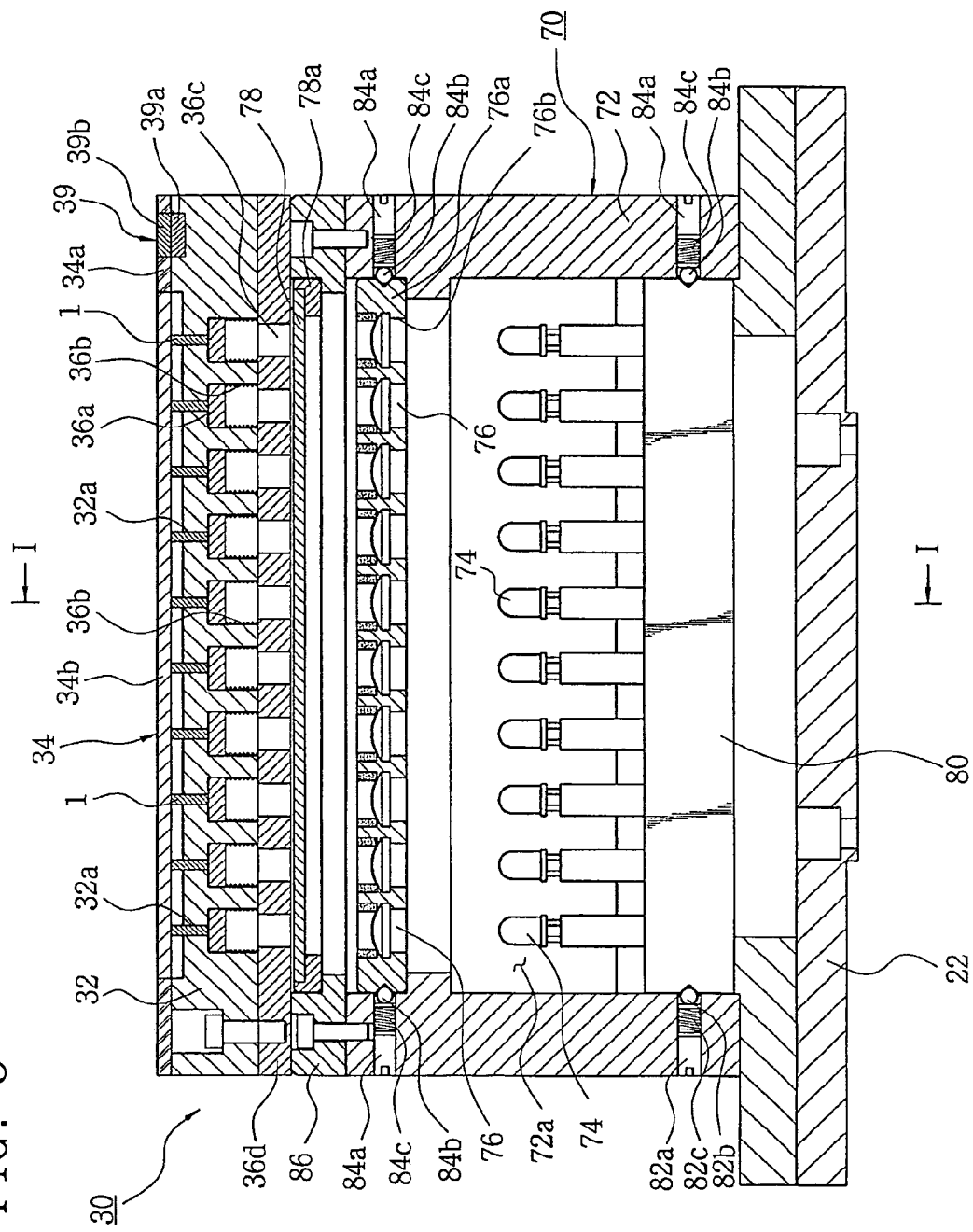
FIG. 3 is a sectional view showing configurations of a fixture and a first illumination device according to the present invention.
Figure 4:
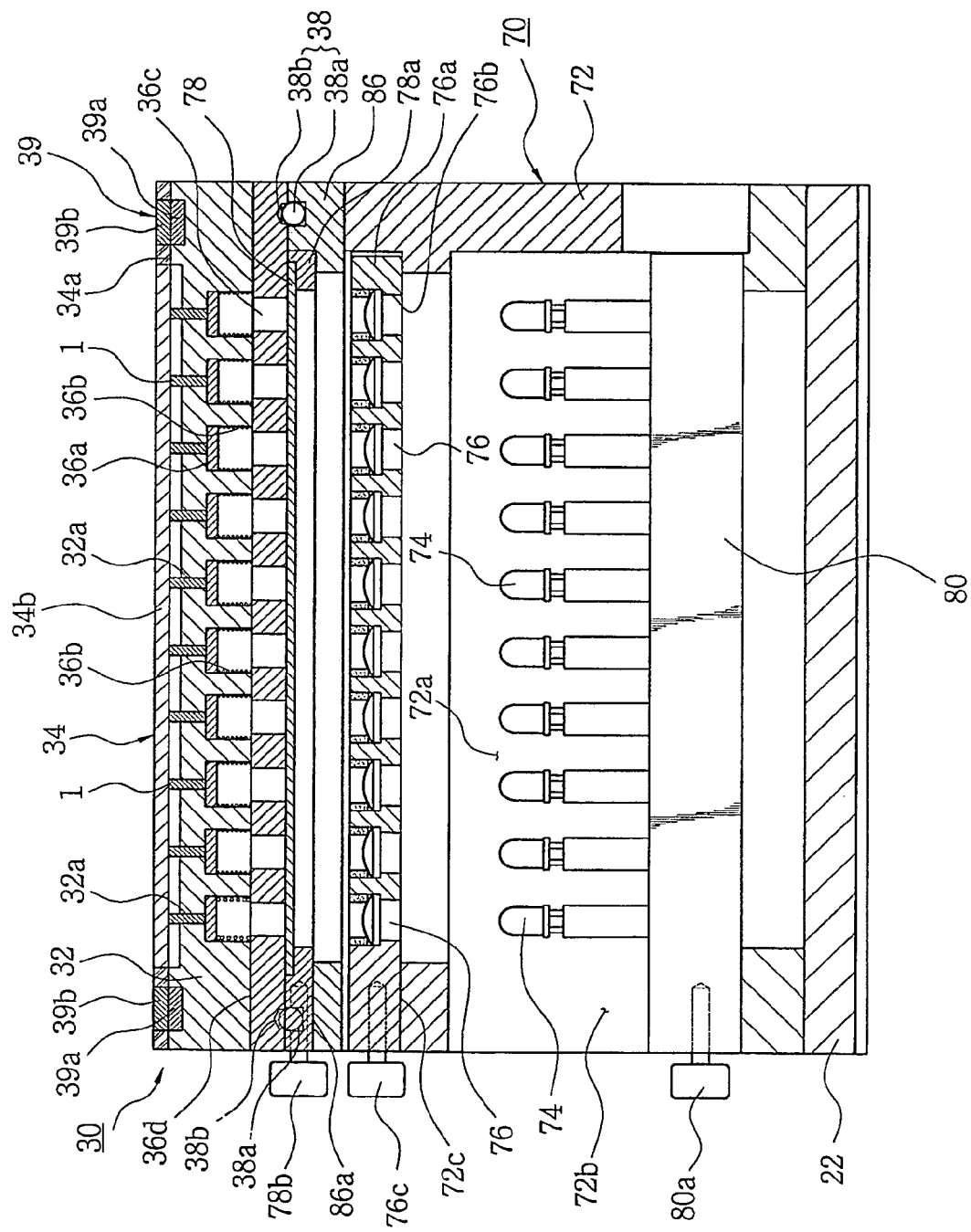
FIG. 4 is a sectional view taken along line I—I in FIG. 3.
Figure 5:
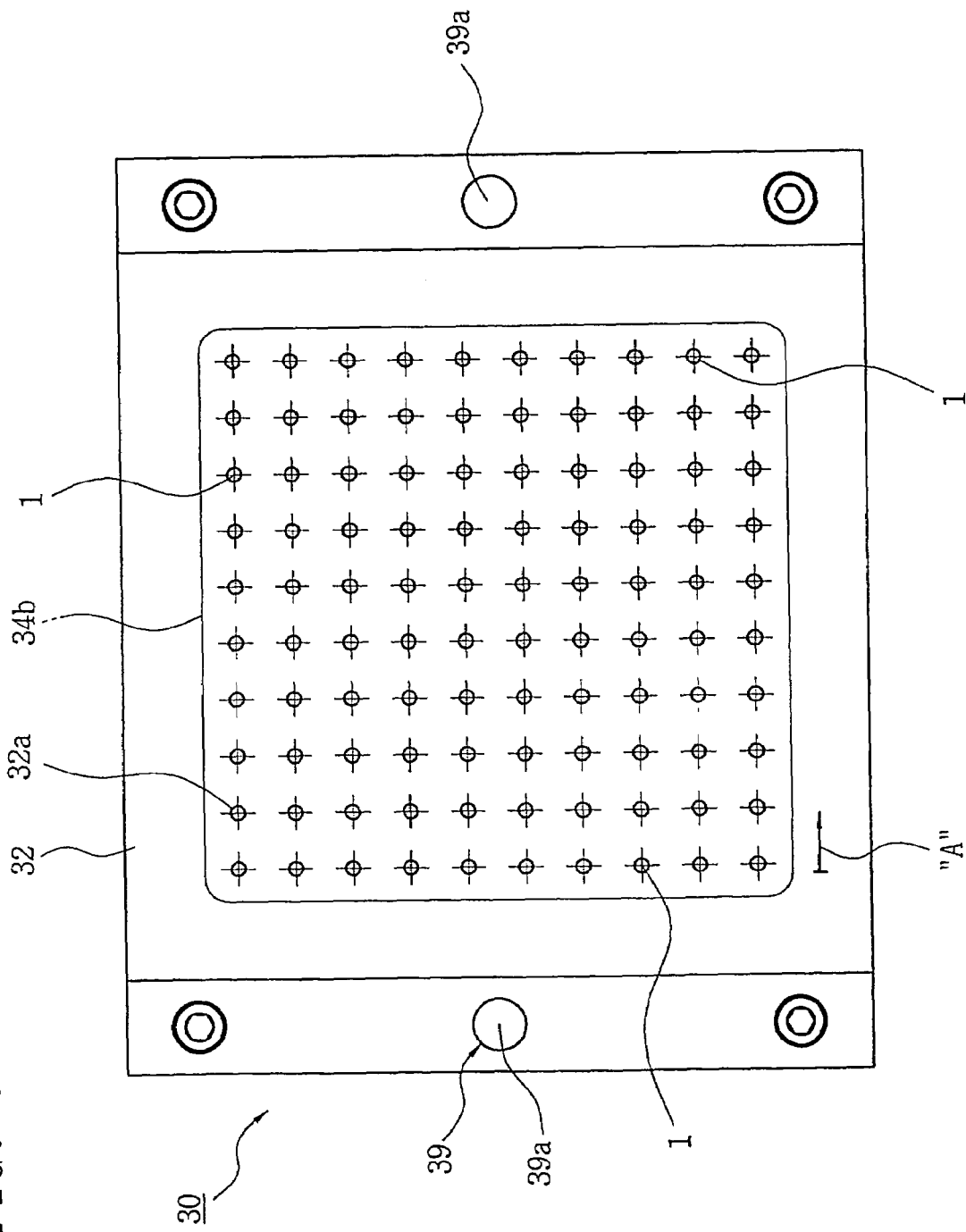
FIG. 5 is a plan view showing the configuration of the fixture according to the present invention.

Referring to FIGS. 1 and 3 to 5, the machine for inspecting ferrules of the present invention has a fixture 30 that can arrange the plurality of ferrules 1 in a Cartesian coordinate system. The fixture 30 comprises a tray 32 which is detachably loaded on the stage 22 of the robot 10 and in which a plurality of holes 32a for receiving the ferrules 1 are formed to define the Cartesian coordinate system, an upper pressing means 34 which is detachably mounted on a top surface of the tray 32 and which aligns the ferrules 1 by pressing upper ends of the ferrules 1 accommodated in the holes 32a of the tray 32, and a lower pressing means 36 which aligns the ferrules 1 by pressing lower ends of the ferrules 1. In FIG. 5, the holes 32a of the fixture 30 are formed in 10 rows by 10 columns giving the total number of 100 holes. However, this is only for illustrative purposes and the number and position of the holes 32a can be appropriately changed.

Referring to FIGS. 3 and 4, the upper pressing means 34 comprises a window frame 34a detachably mounted on the top surface of the tray 32, and a transparent glass panel 34b, which is mounted on the window frame 34a to press the upper ends of the ferrules 1. The lower pressing means 36 comprises transparent glass pieces 36a which are respectively accommodated in the holes 32a of the tray 32 to press the lower ends of the ferrules 1, springs 36b for biasing the glass pieces 36a upwardly, and a bottom plate 36d which is attached to the bottom of the tray 32 to prevent the glass pieces 36a and the springs 36b from escaping from the holes 32a and in which holes 36c communicating with the holes 32a are formed. The glass panel 34b of the upper pressing means 34 and the glass pieces 36a of the lower pressing means 36 can be made of transparent synthetic resin.

Figure 7:
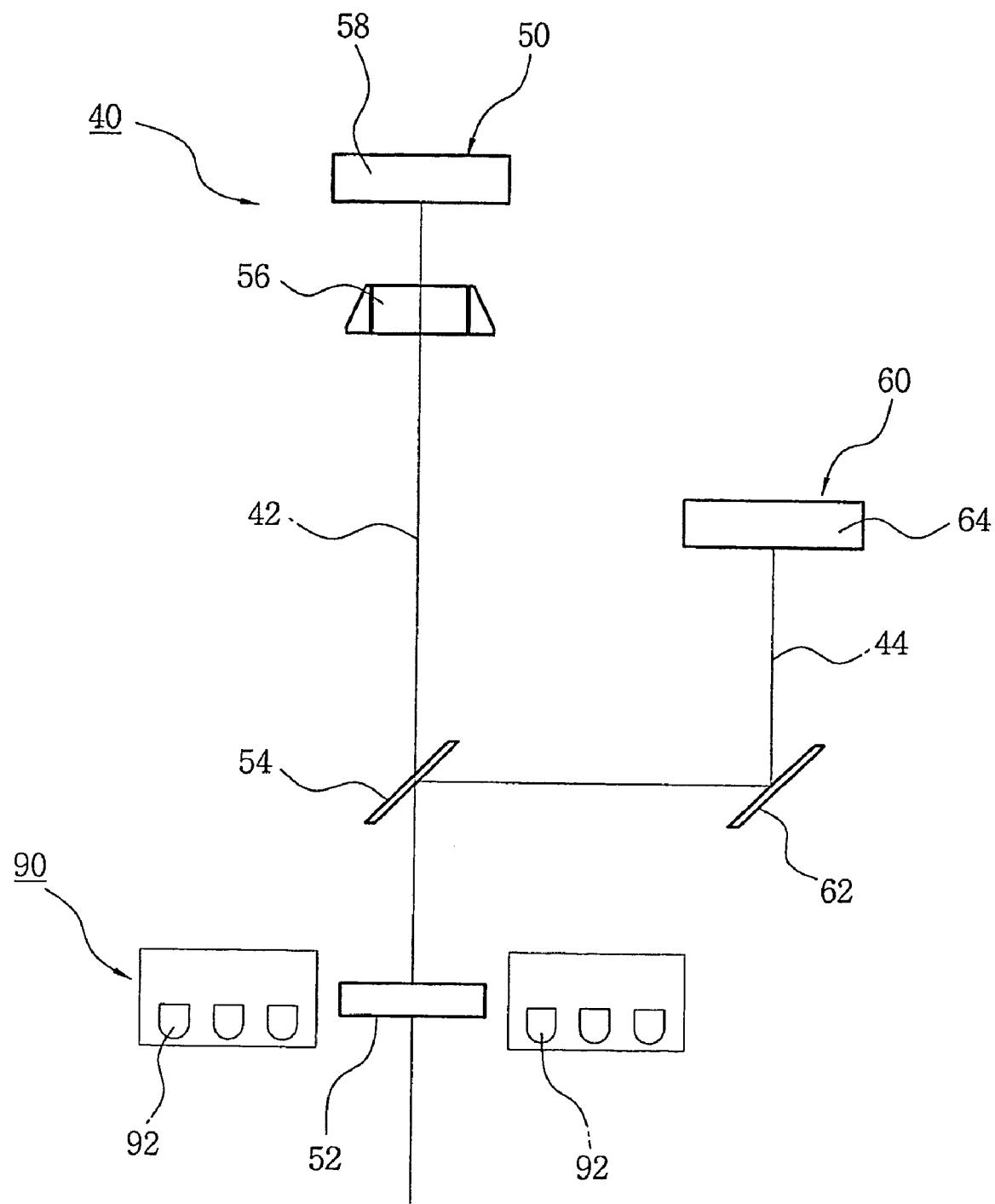
FIG. 7 is a schematic view showing configurations of an optical system and a second illumination device according to the present invention.

Referring to FIGS. 1 and 7, the machine for inspecting ferrules according to the present invention includes an optical system 40 which can simultaneously obtain outside diameter image data and inside diameter image data by photographing inside diameter and outside diameter images of the ferrules 1. The optical system 40 is fixedly installed to the third slide 18e of the Z-axis linear motion actuator 18. Therefore, the optical system 40 can linearly move in X-axis and Z-axis directions by means of the X-axis linear motion actuator 14 and the Z-axis linear motion actuator 18 of the robot 10. The optical system 40 comprises a first camera 50 with a narrow view for outputting inside diameter image data by photographing the inside diameter images of the ferrules 1, and a second camera 60 with a wide view for outputting outside diameter image data by photographing the outside diameter images of the ferrules 1.

In addition, the first camera 50 comprises an objective lens 52, a beam splitter 54, an extending lens 56 and a first image sensor 58 which are sequentially aligned with one another on a first optical axis 42 of the optical system 40. The beam splitter 54 of the first camera 50 splits an incident light coming from the objective lens 52 into a first exit light incident on the extending lens 56 and a second exit light which forms a right angle with respect to the first optical axis 42 of the optical system 40. The second camera 60 comprises a mirror 62 for reflecting the second exit light coming from the beam splitter 54 of the first camera 50 on a second optical axis 44 of the optical system 40, and a second image sensor 64 arranged on the second optical axis 44 of the optical system 40 to receive the light reflected from the mirror 62. In this embodiment, each of the first image sensor 58 of the first camera 50 and the second image sensor 64 of the second camera 60 consists of a charge coupled device (CCD) image sensor with 768×494 pixels, and the first camera 50 has a high magnification about 5 times larger than that of the second camera 60 since an optic angle is extended by means of the extending lens 56. As shown in FIG. 2, the first and second cameras 50 and 60 of the optical system 40 are mounted on a front face of a carriage 68 and protected by a cover 66, and the carriage 68 is fixed to the third slide 18e of the Z-axis linear motion actuator 18.

Referring again to FIGS. 1 and 3 to 5, the machine for inspecting ferrules according to the present invention further comprises a first illumination device 70 installed on the top surface of the stage 22 below the fixture 30 to project the images of the ferrules 1, and a second illumination device 90 mounted to be concentrically aligned with the objective lens 52 of the first camera 50. The first illumination device 70 comprises a housing 72 which is installed on the stage 22 of the Cartesian coordinate type robot 10, formed with a darkroom 72a with an open top portion, and formed with first and second inlets 72b and 72c in a front face of the housing; a plurality of light emitting diodes 74 installed in the darkroom 72a of the housing 72 to be aligned with the holes 32a of the tray 32, a plurality of condenser lenses 76 for condensing light coming from the respective light emitting diodes 74, and a diffuser 78 for diffusing the exit light coming from the condenser lenses 76. The light emitting diodes 74 of the first illumination device 70 may include red or white light emitting diodes.

Referring to FIGS. 3 and 4, the light emitting diodes 74 are arranged on a top surface of a base 80 installed to be taken out through the first inlet 72b of the housing 72, and a knob 80a is installed at a front surface of the base 80. The base 80 is fixedly supported by a first ball 82b pushed by a first set screw 82a which is screwed through the housing 72. A first spring 82c is interposed between the first set screw 82a and the first ball 82b. The condenser lenses 76 are fitted into holes 76b of a lens holder 76a installed to be taken out through the second inlet 72c of the housing 72, and a knob 76c is installed on a front surface of the lens holder 76b. The lens holder 76a is fixedly supported by a second ball 84b pushed by a second set screw 84a which is screwed through the housing 72. A second spring 84c is interposed between the second set screw 84a and the second ball 84b. The diffuser 78 is installed by means of a diffuser holder 78a to be taken out through an inlet 86a of a cover 86 mounted on a top surface of the housing 72, and a knob 78b is installed on the diffuser holder 78a of the diffuser 78.

Figure 6:
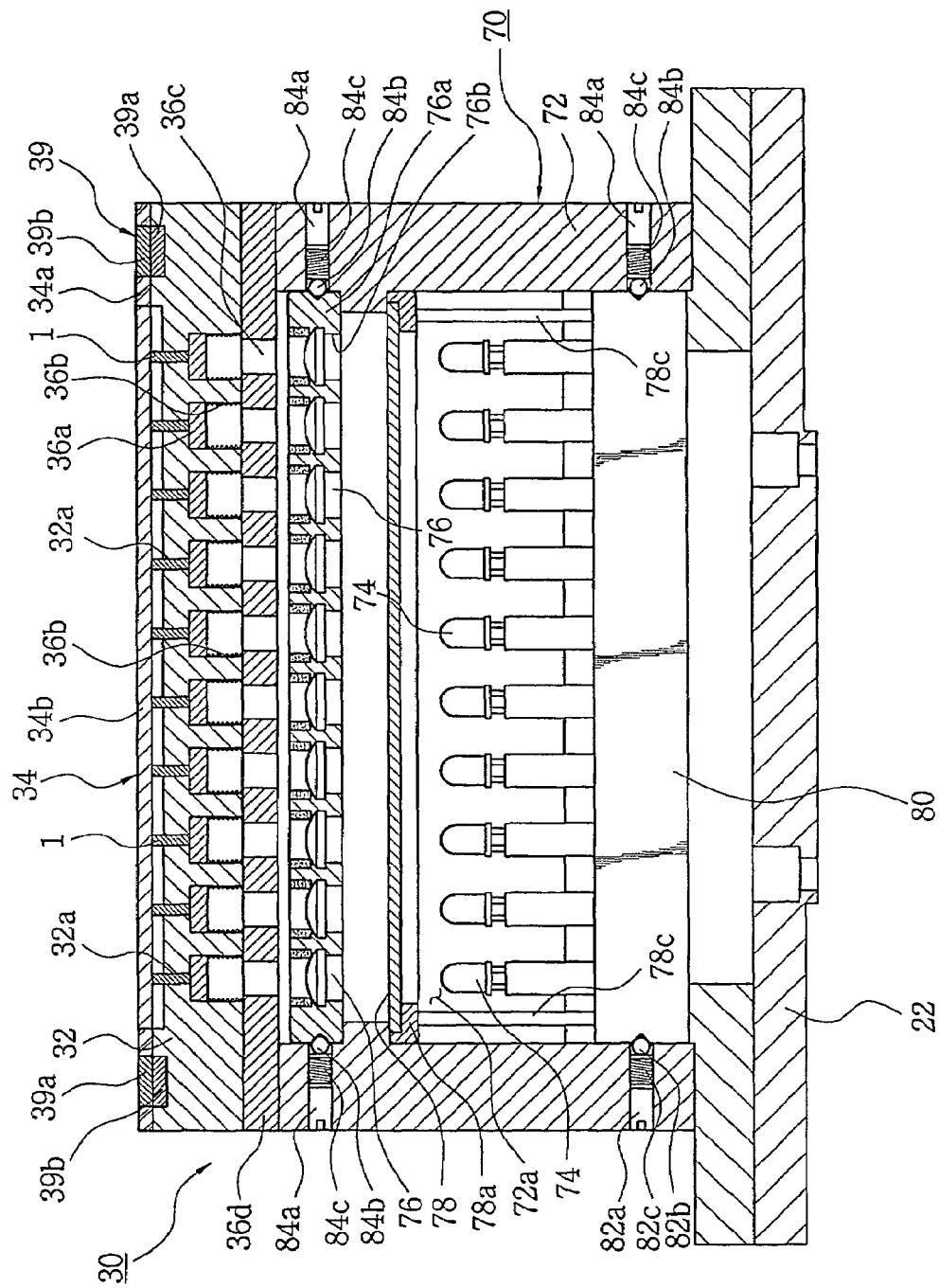
FIG. 6 is a plan view showing a variant of the fixture and first illumination device according to the present invention.

FIG. 6 shows a variant of the fixture 30 and first illumination device 70 according to the present invention. Referring to FIG. 6, the bottom plate 36d of the fixture 30 is mounted on the housing 72 of the first illumination device 70. The plurality of light emitting diodes 74 are installed in the darkroom 72a of the housing 72 to be aligned with the holes 32a of the tray 32. The diffuser 78 for diffusing the light coming from the light emitting diodes 74 is mounted above the light emitting diodes 74 via the diffuser holder 78a. The diffuser holder 78a is supported on the base 80 by a plurality of posts 78c. The condenser lenses 76 are installed above the diffuser 78 so as to condense and emit the light coming from the diffuser 78 and are installed in the holes 76b of the lens holder 76a to be aligned with the holes 32a of the tray 32 and the light emitting diodes 74.

As shown in FIG. 7, the second illumination device 90 comprises a plurality of light emitting diodes 92 arranged annularly and concentrically around the objective lens 52 of the first camera 50. The light emitting diodes 92 of the second illumination device 90 may include red or white light emitting diodes in the same manner as the light emitting diodes 74 of the first illumination device 70.

As shown in detail in FIG. 4, the fixture 30 is detachably arranged on the cover 86 of the first illumination device 70 by means of a positioner 38. The positioner 38 comprises a plurality of balls 38a protruding from the top surface of the cover 86 of the first illumination device 70, and a groove 38b formed in a bottom surface of the bottom plate 36d of the fixture 30 so that the balls 38a are fitted thereinto. The fitting of the balls 38a into the groove 38b allows the fixture 30 to be accurately arranged above the first illumination device 70.

As shown in FIGS. 3 to 5, the tray 32 of the fixture 30 and the window frame 34a of the upper pressing means 34 are detachably attached by an attaching means 39. The attaching means 39 comprises a plurality of first magnets 39a embedded into the top surface of the tray 32, and second magnets 39b mounted on the window frame 34a to correspond to the first magnets 39a of the tray 32. Although two magnets 39a and 39b are shown in FIG. 4, this is only for illustrative purposes. The number and positions of first and second magnets 39a and 39b can be appropriately changed. Since the window frame 34a of the upper pressing means 34 is mounted on the top surface of the tray 32 by means of magnetic forces of the first and second magnets 39a an 39b, the upper ends of the ferrules 1 can be precisely pressed by the glass panel 34b.

Referring to FIG. 1, the image data of the ferrules 1 output from the first and second cameras 50 and 60 of the optical system 40 are input in real time into a computer 100. The computer 100 comprises a microprocessor, an output device such as a monitor 102 and a printer, and an input device such as a keyboard. The computer 100 processes the image data of the ferrules 1 input from the first and second cameras 50 and 60 of the optical system 40 by means of a computer program, displays them on the monitor 102, and sorts the ferrules by superior and inferior ferrules. The computer 100 is interfaced with a controller 110 that controls the operations of the robot 10 and the first and second illumination devices 70 and 90 so as to control the machine for inspecting ferrules. An inspector can control the amount of light from the first and second illumination devices 70 and 90 by manipulating the controller 110.

Figure 8A:
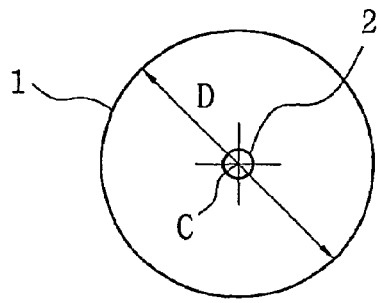
FIGS. 8a and 8b are views showing a single ferrule as an example of a ferrule which can be inspected by the machine for inspecting ferrules according to the present invention.
Figure 8B:
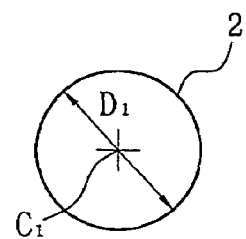
Figure 9A:
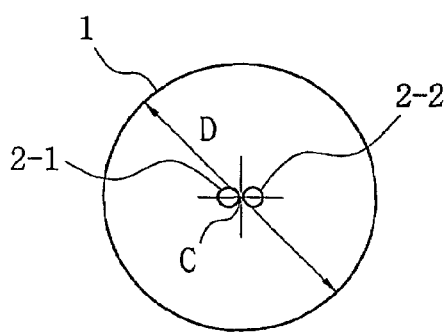
FIGS. 9a and 9b are views showing a dual ferrule as an example of a ferrule which can be inspected by the machine for inspecting ferrules according to the present invention.
Figure 9B:
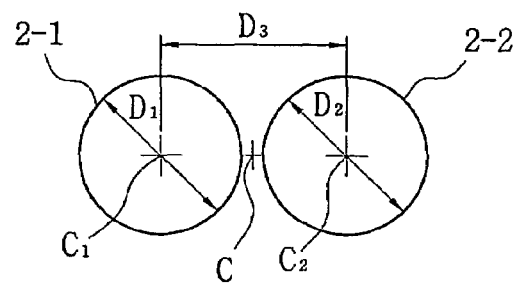
Figure 10A:
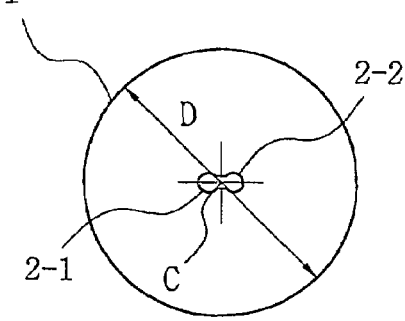
Figure 10B:
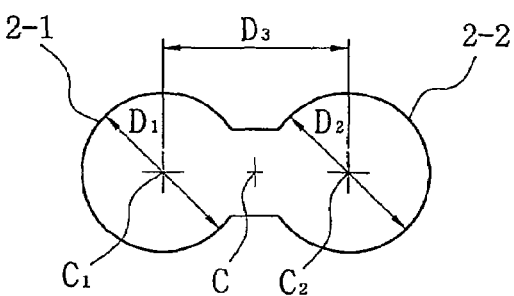
Figure 11A:
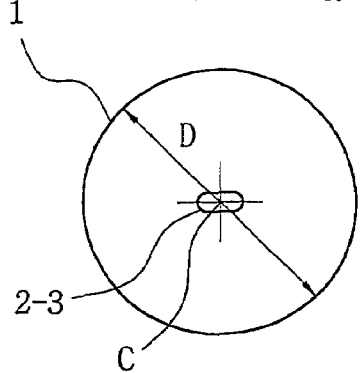
FIGS. 11a and 11b are views showing a track ferrule as an example of a ferrule which can be inspected by the machine for inspecting ferrules according to the present invention.
Figure 11B:
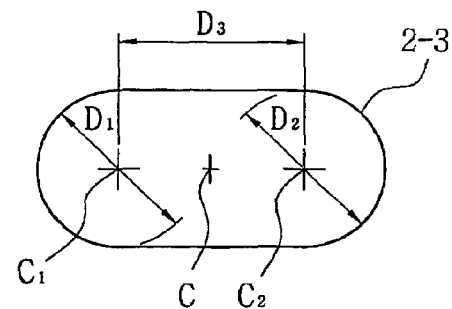

FIGS. 8a to 11b show ferrules with a variety of configurations that can be inspected by the machine for inspecting ferrules of the present invention. A ferrule 1 shown in FIGS. 8a and 8b is a single ferrule with a hole 2 formed at its center C. In case of the single ferrule, an outside diameter D, an inside diameter $D_1$, and eccentricity of the center $C_1$ of the inside diameter $D_1$ with respect to the center C of the outside diameter D are inspected. A ferrule 1 shown in FIGS. 9a and 9b is a dual ferrule in which two holes 2-1 and 2-2 are formed equidistantly from its center C. In case of the dual ferrule, an outside diameter D, inside diameters $D_1$ and $D_2$ for the holes 2-1 and 2-2, and the distance $D_3$ between the centers $C_1$ and $C_2$ of the two inside diameters $D_1$ and $D_2$, are inspected. As shown in FIGS. 12b and 12c, in case of the dual ferrule, eccentricity between the center C of the outside diameter D and a midpoint $C_3$ on a line S connecting the centers $C_1$ and $C_2$ of the holes 2-1 and 2-2 is also inspected.

A ferrule 1 shown in FIGS. 10a and 10b is a dog-bone ferrule in which two holes 2-1 and 2-2 communicate with each other. A ferrule 1 shown in FIGS. 11a and 11b is a track ferrule in which an elliptical hole 2-3 with two centers $C_1$ and $C_2$ with respect to the center C of the ferrule is formed. In case of the dog-bone ferrule and track ferrule, an outside diameter D, inside diameters $D_1$ and $D_2$, eccentricity, and the distance $D_3$ between the two inside diameters $D_1$ and $D_2$ are inspected in the same manner as the dual ferrule.

Figure 14A:
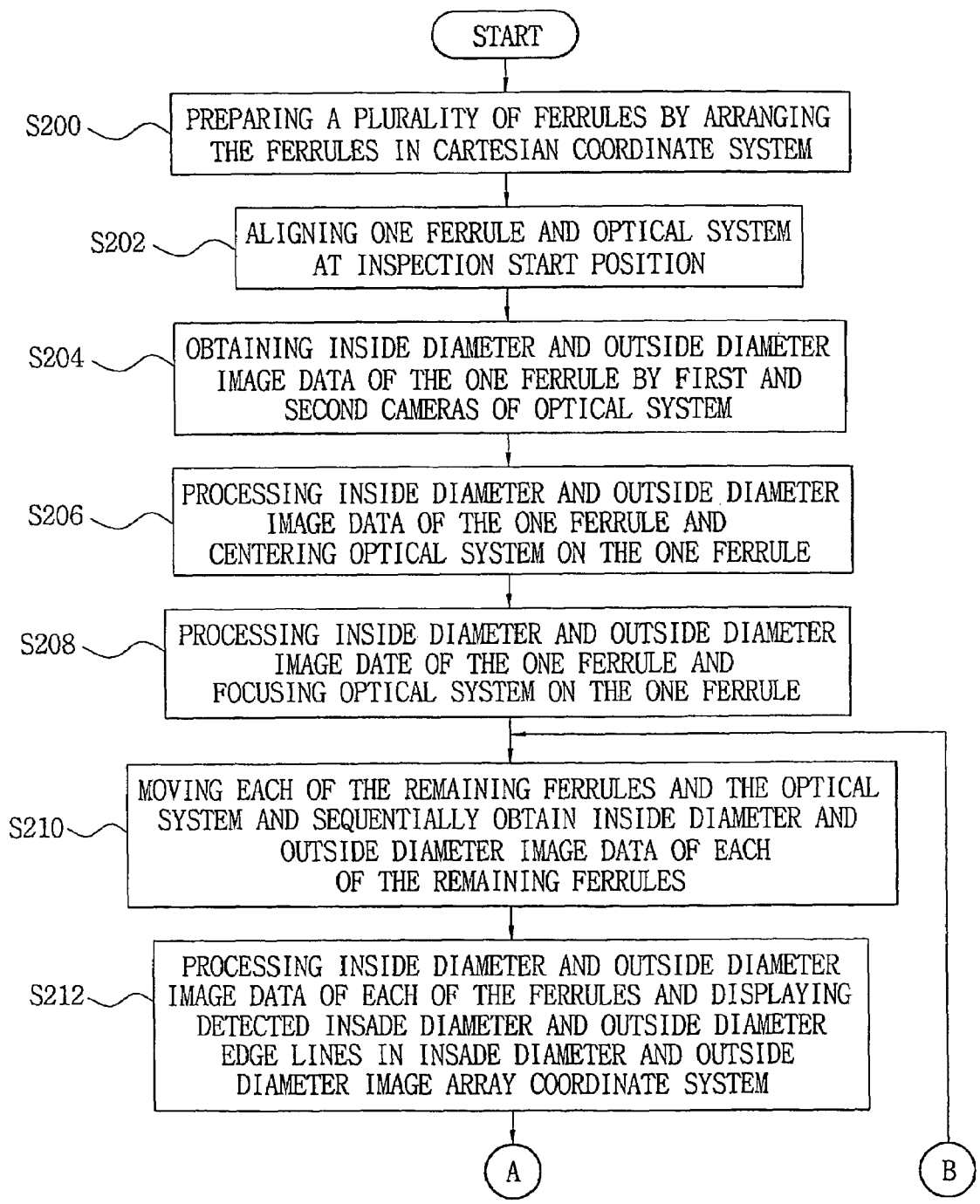
FIGS. 14a and 14b are flowcharts illustrating the method of inspecting ferrules according to the present invention.
Figure 14B:
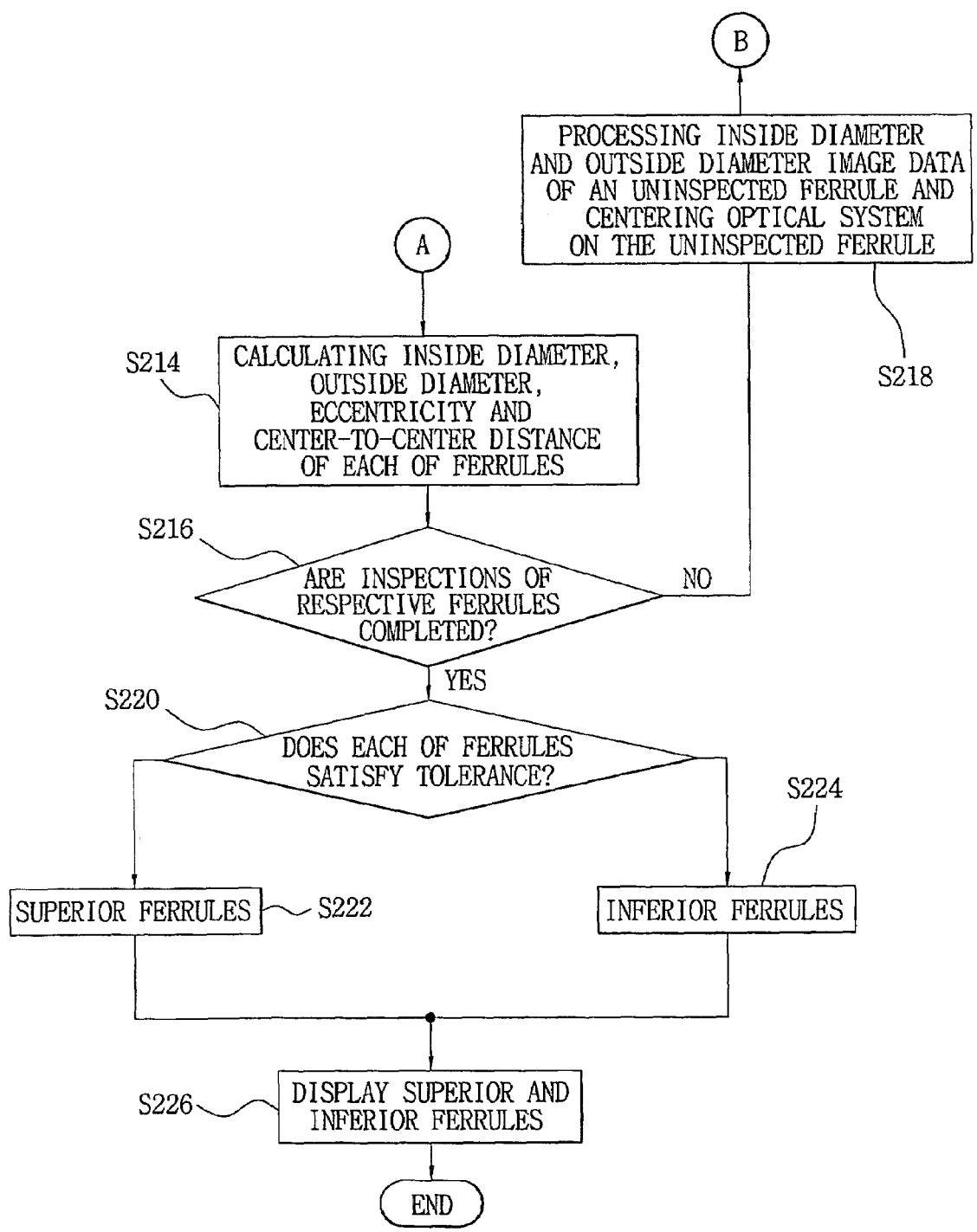

Next, a method of inspecting ferrules by using the machine for inspecting ferrules of the optical connector according to the present invention constructed as such will be described with reference to FIGS. 14a and 14b. A method of inspecting dual ferrules will be mainly described by way of example.

Referring to FIGS. 3 and 4 together, when the inspector inputs the ferrules 1 into the holes 32a of the tray 32, the lower ends of the ferrules 1 passing through the holes 32a of the tray 32 come into contact and are aligned with the glass pieces 36a of the lower pressing means 36, and the springs 36b bias the glass pieces 36a upwardly to stably maintain contact between the lower ends of the ferrules 1 and the glass pieces 36a. When the window frame 34a of the upper pressing means 34 is mounted on the top surface of the tray 32 by means of the magnetic forces of the first and second magnets 39a and 39b, the glass panel 34b of the upper pressing means 34 precisely presses the upper ends of the ferrules 1 inserted into the holes 32a of the tray 32. Therefore, the upper ends of the ferrules 1 accommodated in the holes 32a of the tray 32 can be precisely aligned in a horizontal plane, and the height error of the ferrules 1 can be minimized. As described above, when the inspector aligns the ferrules 1 in the Cartesian coordinate system by means of the fixture 30 and then fits the groove 38b formed in the bottom plate 36d of the fixture 30 over the balls 38a of the positioner 38 protruding from the cover 86 of the first illumination device 70, the fixture 30 can be precisely arranged above the first illumination device 70 and the plurality of ferrules 1 aligned in the Cartesian coordinate system are prepared at an inspection place of the robot 10 (S200).

Referring to FIGS. 1 and 2, one ferrule 1 and the optical system 40 are aligned at an inspection start position by operating the X-axis and Y-axis linear motion actuators 14 and 16 of the robot 10 through the control of the controller 110 (S202). In this embodiment, the inspection start position for the ferrule 1 is established based on a hole in the first row and first column of the holes 32a of the tray 32, and an inspection completion position is established based on a hole in the tenth row and tenth column of the holes 32a of the tray 32. Although the inspection start position is designated by an arrow "A" at a front left portion of the tray 32 in FIG. 5, this is only for illustrative purposes. The inspection start position may be established at a front right portion or a rear left or right portion of the tray 32. After the ferrules 1 arranged in the first row of the holes of the tray 32 are completely inspected, the center of the optical system 40 is aligned with the center of a ferrule 1 inserted into a hole in the second row and first column of the holes 32a.

Meanwhile, when the first servo motor 14b of the X-axis linear motion actuator 14 is driven to rotate the first ball screw 14d, the first slide 14e screwed by means of the rotation of the first ball screw 14d is slid along the first guide rail 14a to move the Z-axis linear motion actuator 16 in the X-axis direction. When the second servo motor 16b of the Y-axis linear motion actuator 16 is driven to rotate the second ball screw 16d, the second slide 16e screwed by means of the rotation of the second ball screw 16d is slid along the second guide rail 16a to move the stage 22 in the Y-axis direction. With the movement in the Cartesian coordinate system performed by the X-axis and Y-axis linear motion actuators 14 and 16, the first optical axis 42 of the optical system 40 and the ferrule 1 inserted into one of the holes 32a of the tray 32 can be precisely aligned with each other.

Referring to FIGS. 3 and 7, after one ferrule 1 and the optical system 40 are aligned at the inspection start position, the inside diameter and outside diameter images of the ferrule 1 are projected by means of the illumination of the first and second illumination devices 70 and 90. The inside diameter and outside diameter image data of the ferrule 1 are obtained by photographing the inside diameter and outside diameter images of the ferrule 1 using the first and second cameras 50 and 60 of the optical system 40 (S204). When the relevant light emitting diode 74 of the first illumination device 70 is turned on through the control of the controller 110, the light coming from the light emitting diode 74 of the first illumination device 70 is condensed through the condenser lens 76, and the exit light coming from the condenser lens 76 is diffused by the diffuser 78 and then clearly projects the inside diameter image of the ferrule 1 while passing through the relevant hole 36c of the bottom plate 36d, the relevant glass piece 36a and the interior of the ferrule 1 defined by the inside diameter.

Referring to FIG. 6, the light coming from the relevant light emitting diode 74 of the first illumination device 70 is diffused by the diffuser 78, and the light coming from the diffuser 78 is condensed through the condenser lens 76 and then clearly projects the inside diameter image of the ferrule 1 while passing through the relevant hole 36c of the bottom plate 36d, the relevant glass piece 36a and the interior of the ferrule 1 defined by the inside diameter. In such a way, the illumination efficiency of the first illumination device 70 can be improved by uniformly diffusing the light from the light emitting diode 74 by mean of the diffuser 78 and then condensing the light through the condensing lens 76.

On the other hand, when the relevant light emitting diode 92 of the second illumination device 90 is turned on through the control of the controller 110, the light coming from the light emitting diode 92 of the second illumination device 90 is scattered from a surface of the ferrule 1 and then clearly projects the outside diameter image of the ferrule 1. Therefore, the clearness of the inside diameter and outside diameter image data obtained by the first and second cameras 50 and 60 of the optical system 40 can be significantly improved. The inside diameter and outside diameter images of the ferrule 1 are photographed by being projected on the first image sensor 58 through the objective lens 52 of the first camera 50, the beam splitter 54, and the extending lens 56, and at the same time, by being projected on the second image sensor 64 through the objective lens 52 of the first camera 50, the beam splitter 54, and the mirror 62 of the second camera 60. At this time, the first camera 50 with a narrow view outputs the inside diameter image data obtained by photographing the inside diameter of the ferrule 1 with a high magnification, and the second camera 60 with a wide view outputs the outside diameter image data obtained by photographing the outside diameter of the ferrule 1 with a low magnification.

As shown in FIG. 1, the inside diameter and outside diameter image data of the ferrule 1 output from the first and second cameras 50 and 60 of the optical system 40 are input into the computer 100 in real time. The computer 100 processes the outside diameter image data of the ferrule 1, which are input from the second camera 60 of the optical system 40, by means of the computer program and then performs centering by which the center of the ferrule 1 is caused to coincide with the first optical axis 42 of the optical system 40 (S206). At this time, the computer 100 performs binarization for a gray level image of the outside diameter of the ferrule 1, which is input from the second camera 60, by using a threshold by means of the computer program, and then detects an outside diameter contour from the binary image of the ferrule 1. Thereafter, the computer 100 moves the ferrule 1 and the optical system 40 in the Cartesian coordinate system by operating the X-axis and Y-axis linear motion actuators 14 and 16 of the robot 10 so that the center of the outside diameter contour and the first optical axis 42 of the optical system 40 coincide with each other. Therefore, the centering of the ferrule 1 on the optical system 40 can be precisely and rapidly performed.

In addition, after aligning the first optical axis 42 of the optical system 40 and the center of one ferrule 1, the Z-axis linear motion actuator 18 of the robot 10 is operated to perform focusing of the optical system 40 on the ferrule 1(S208). In performing the focusing of the optical system 40 on the ferrule 1, a focus distance of the optical system 40 is placed at a distant position from the ferrule 1 and the focus distance of the optical system 40 is then caused to approach the ferrule 1 by operating the Z-axis linear motion actuator 18. Thereafter, Laplacian evaluation is repeatedly performed for either of the inside diameter and outside diameter image data of the ferrule 1 input from the first and second cameras 50 and 60 of the optical system 40, e.g., for the inside diameter image data. An inside diameter image of the ferrule 1 detected most clearly is taken as the criterion for focusing. Such precise focusing of the optical system 40 on the ferrule 1 allows the inside diameter and outside diameter image data of the ferrule 1 to be optimally obtained.

After completion of the focusing of the optical system 40 on the one ferrule 1, each ferrule 1 of the remaining ferrules and the optical system 40 are moved to positions corresponding to each other in the Cartesian coordinate system by operating the X-axis and Y-axis linear motion actuators 14 and 16 of the robot 10 through the control of computer 100. Then, the inside diameter image of each ferrule 1 is photographed by the first camera 50 of the optical system 40, and the outside diameter image of each ferrule 1 is photographed by the second camera 60 so as to sequentially obtain the inside diameter and outside diameter image data (S210).

Figure 12A:
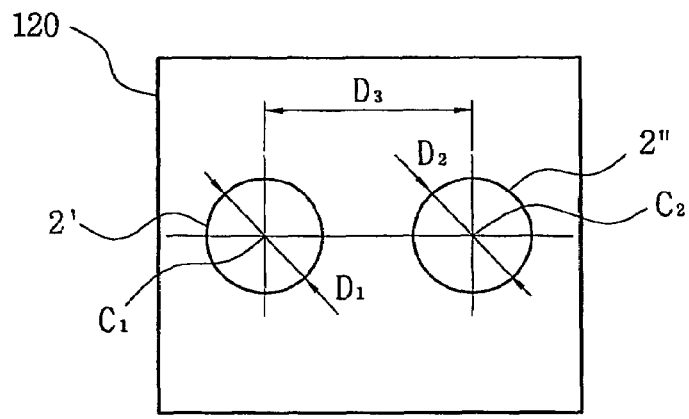
FIGS. 12a to 12c are views illustrating a method of inspecting ferrules by using the machine for inspecting ferrules according to the present invention.
Figure 12B:
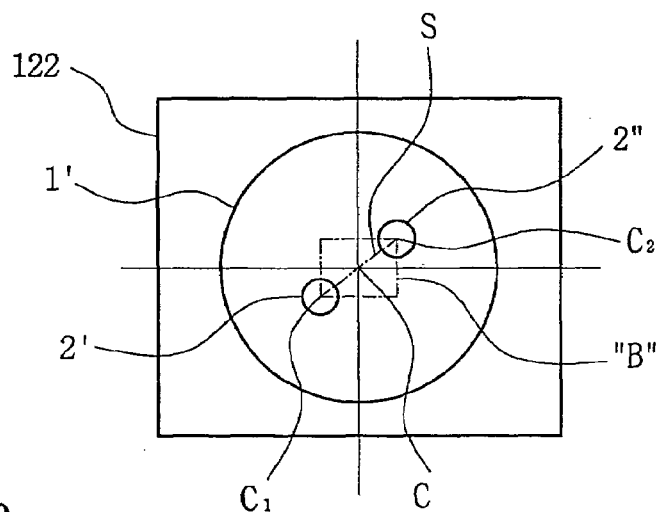
Figure 12C:
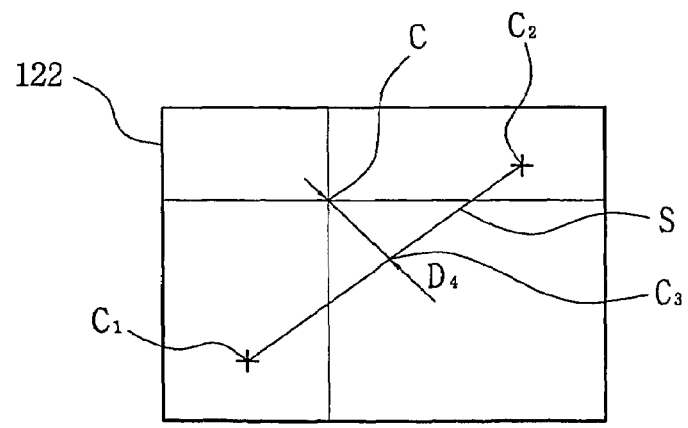

Referring to FIGS. 12a to 12c, the computer 100 processes the inside diameter and outside diameter image data of each ferrule 1, which are input from the first and second cameras 50 and 60 of the optical system 40, by means of the computer program, and then detects inside diameter edge lines 2' and 2" and an outside diameter edge line 1'. Thereafter, the inside diameter edge lines 2' and 2" and the outside diameter edge line 1' are respectively placed in an inside diameter image array coordinate system 120 and an outside diameter image array coordinate system 122 to be displayed on the monitor 102 (S212). At this time, the computer 100 performs binarization for gray level images of the inside and outside diameters of each ferrule 1 by using thresholds and detects inside diameter and outside diameter contours from the binary image of each ferrule 1. Then, the computer detects inside diameter and outside diameter precision contours by means of a Laplacian-of-Gaussian filter. Thereafter, the computer detects the inside diameter edge lines 2' and 2" and the outside diameter edge line 1' by removing noises using the least square error method.

Furthermore, the computer 100 places the inside diameter edge lines 2' and 2" and the outside diameter edge line 1' in the inside diameter and outside diameter image array coordinate systems 120 and 122, respectively, and then, calculates the inside diameters $D_1$ and $D_2$, the outside diameter D, the eccentricity and the center-to-center distance $D_3$ of each ferrule 1 (S214). Since the inside diameters $D_1$ and $D_2$ and the center-to-center distance $D_3$ of each ferrule 1 are calculated using the inside diameter image data input with a high magnification through the photography performed by the first camera 50 with a narrow view, the reliability of the calculated inside diameters $D_1$ and $D_2$ and the center-to-center distance $D_3$ are improved. Even though the outside diameter D of each ferrule 1 is calculated using the outside diameter image data input with a low magnification through the photography performed by the second camera 60 with a wide view, the reliability of inspection can be satisfied. FIG. 12c is a view showing a region "B" of FIG. 12b on an enlarged scale. As shown in FG. 12c, the eccentricity of ferrule 1 is calculated using the distance $D_4$ between the center C of the outside diameter D and the midpoint $C_3$ of the line S connecting the centers $C_1$ and $C_2$ of the inside diameters $D_1$ and $D_2$. In case of the single ferrule shown in FIGS. 8a and 8b, the eccentricity thereof is calculated using the inside diameter $D_1$, the outside diameter D and the distance between the center $C_1$ of the inside diameter $D_1$ and the center C of the outside diameter D. The inside diameter $D_1$ and $D_2$, the outside diameter D, the eccentricity and the center-to-center distance $D_3$ of the dog-bone ferrule shown in FIGS. 10a and 10b or the track ferrule shown in FIGS. 11a and 11b are the same as those of the dual ferrule described above. Therefore, as for the method of inspecting the dog-bone ferrule and the track ferrule, refer to that of the dual ferrule and it will be omitted herein. Alternatively, the inside diameter image data of each ferrule 1 input from the first camera 50 with a narrow view and the outside diameter image data of each ferrule 1 input from the second camera 60 with a wide view may be processed by the computer program and then matched to a single image array coordinate system, so that the inside diameter $D_1$ and $D_2$, the outside diameter D, the eccentricity and the center-to-center distance $D_3$ can be detected.

Figure 13:
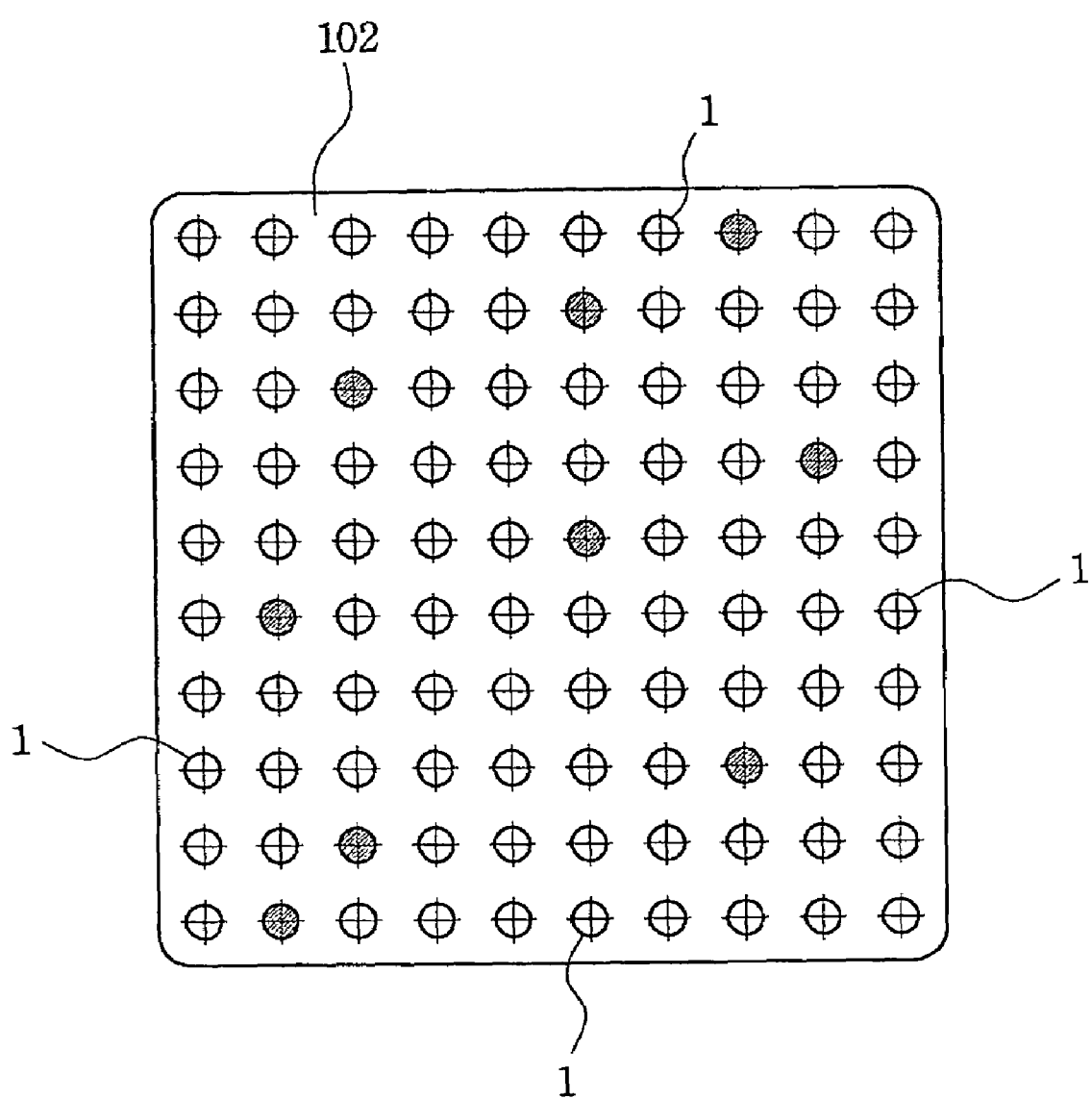
FIG. 13 is a view of a screen showing a result of the inspection of ferrules obtained by the machine for inspecting ferrules according to the present invention.

The computer 100 determines whether the inspections of the respective ferrules 1 are completed by checking as to whether the entire number of ferrules 1 that have been inspected corresponds to the predetermined number of ferrules to be inspected (S216). If it is determined that the inspections of the ferrules 1 are not completed, the computer 100 processes the outside diameter image data of the ferrule 1, which are input from the second camera 60 of the optical system 40, by means of the computer program, and then performs the centering by which the center of the ferrule 1 and the first optical axis 42 of the optical system 40 are caused to coincide with each other, in the same manner as step S206 (S218). Thereafter, the procedure proceeds to step S210. If it is determined that the inspections of the ferrules 1 are completed, the computer 100 determines whether the inside diameters, the outside diameter, the eccentricity and the distance between the centers of the two inside diameters of each ferrule 1 satisfy a predetermined tolerance (S220). Then, ferrules 1 satisfying the tolerance are sorted as superior ferrules (S222), and ferrules 1 that do not satisfy the tolerance are sorted as inferior ferrules (S224). Finally, as shown in FIG. 13, the computer 100 arranges the respective ferrules 1, which have been completely inspected, in the Cartesian coordinate system and displays them on the monitor 102 so that the inspector can distinguish between the superior and inferior ferrules (S226). For example, the superior ferrules may be displayed in green, and the inferior ferrules may be displayed in red. In FIG. 13, the inferior ferrules are hatched. Therefore, the inspector can conveniently recognize the superior and inferior ferrules.

The above description is merely the description of preferred embodiments of the present invention, and the scope of the present invention is not limited to the described and illustrated embodiments. Those skilled in the art can make various changes, modifications and substitutions thereto within the technical spirit and the scope of the present invention defined by the appended claims. It should be understood that such embodiments fall within the scope of the present invention.

INDUSTRIAL APPLICABILITY

According to the machine for inspecting ferrules of the optical connector and the method thereof of the present invention described above, the inside diameters and the outside diameter image data of each ferrule are obtained from the inside diameters and the outside diameter of the ferrule by the optical system having dual windows with a narrow view and a wide view and dual magnifications, and then processed by means of the computer program. Thus, the inside diameters, the outside diameter, the eccentricity and the distance between the centers of the two inside diameters of each ferrule can be simultaneously and precisely inspected. Further, the inspections of the plurality of ferrules can be conveniently and efficiently performed. In addition, since superior and inferior ferrules can be automatically sorted, there is an advantage in that the total inspection of the ferrules can be conveniently performed.

The invention claimed is:

1. A machine for inspecting ferrules of an optical connector, comprising:
    a Cartesian coordinate type robot capable of performing 3-axis movement in X-axis, Y-axis and Z-axis directions;
    a fixing means installed to move in a Y-axis direction by means of the robot for arranging a plurality of ferrules in a Cartesian coordinate system;
    an optical system provided to move in X-axis and Y-axis directions by means of the robot for obtaining inside diameter and outside diameter image data of each of the plurality of ferrules;
    a first illumination means positioned below the fixing means for illuminating each of the plurality of ferrules with back light;
    a second illumination means positioned to move integrally with the optical system for illuminating each of the plurality of ferrules; and
    a computer for processing the inside diameter and outside diameter image data from the optical system by means of a computer program.

2. The machine as claimed in claim 1, wherein the fixing means comprises:
    a tray in which a plurality of holes accommodating the ferrules define the Cartesian coordinate system;
    a transparent upper pressing means mounted on a top surface of the tray for aligning the ferrules by pressing upper ends of the ferrules accommodated in the holes of the tray; and
    a lower pressing means installed in the holes of the tray for aligning the ferrules by pressing lower ends of the ferrules accommodated in the holes of the tray.

3. The machine as claimed in claim 1, wherein the optical system comprises a first camera with a narrow view for photographing an inside diameter image of each of the ferrules and outputting the inside diameter image data, and a second camera with a wide view for photographing an outside diameter image of each of the ferrules and outputting the outside diameter image data.

4. The machine as claimed in claim 3, wherein the first camera comprises an objective lens, a beam splitter, an extending lens and a first image sensor that are sequentially aligned on a first optical axis of the optical system, and the second camera comprises a mirror for reflecting the light coming from the beam splitter to a second optical axis of the optical system and a second image sensor aligned on the second optical axis.

5. The machine as claimed in claim 1, wherein the first illumination means comprises:
    a plurality of light emitting diodes arranged to illuminate an inside diameter of each of the ferrules arranged in the fixing means;
    a plurality of condenser lenses for condensing light coming from each of the light emitting diodes; and
    a diffuser for diffusing light coming from the condenser lenses.

6. The machine as claimed in claim 1, wherein the first illumination means comprises:
    a plurality of light emitting diodes arranged to illuminate an inside diameter of each of the ferrules arranged in the fixture;
    a diffuser that is disposed above the light emitting diodes and diffuses light coming from the light emitting diodes; and a plurality of condenser lenses for condensing light coming from the diffuser.

7. The machine as claimed in claim 1, wherein the second illumination means comprises a plurality of light emitting diodes arranged concentrically with the objective lens of the optical system.

8. A method of inspecting ferrules of an optical connector, comprising the steps of:
- preparing a plurality of ferrules by arranging the ferrules in a Cartesian coordinate system;
- centering an optical system on one ferrule of the ferrules;
- focusing the optical system on the one ferrule of the ferrules to obtain inside diameter and outside diameter image data of the one ferrule;
- moving each of the remaining ferrules and the optical system to positions corresponding to each other and sequentially obtaining inside diameter and outside diameter image data of each of the remaining ferrules by means of the optical system;
- calculating an inside diameter, an outside diameter and eccentricity of each of the ferrules by processing the inside diameter and outside diameter image data of each of the ferrules by means of a computer program; and
- sorting each of the ferrules as superior ferrules if the inside diameter, the outside diameter and the eccentricity of each of the ferrules satisfy a tolerance and displaying the ferrules.

9. The method as claimed in claim 8, wherein the step of focusing the optical system is performed by applying Laplacian evaluation to the inside diameter and outside diameter image data input from the optical system while causing focus distance of the optical system placed at a distant position from the one ferrule to approach the one ferrule.

10. The method as claimed in claim 9, wherein the inside diameter image data of each of the ferrules are obtained through photographing performed by a first camera with a narrow view of the optical system, and the outside diameter image data of each of the ferrules are obtained through photographing performed by a second camera with a wide view of the optical system.

11. The method as claimed in claim 8, wherein the inside diameter image data of each of the ferrules are obtained through photographing performed by a first camera with a narrow view of the optical system, and the outside diameter image data of each of the ferrules are obtained through photographing performed by a second camera with a wide view of the optical system.

12. The method as claimed in claim 8, wherein in the step of calculating the eccentricity of each of the ferrules, if there are two inside diameters, the distance between the center of an outside diameter and a midpoint of a line connecting the centers of the two inside diameters is calculated and the distance between the centers of the two inside diameters is further calculated.

* * * * *